United States Patent [19]

Morishima et al.

[11] Patent Number: 5,708,802
[45] Date of Patent: Jan. 13, 1998

[54] SEMICONDUCTOR MEMORY DEVICE

[75] Inventors: Chikayoshi Morishima; Shigeki Ohbayashi, both of Tokyo, Japan

[73] Assignee: Mitsubishi Denki Kabushiki Kaisha, Tokyo, Japan

[21] Appl. No.: 564,651

[22] Filed: Nov. 29, 1995

[51] Int. Cl.[6] .................................................. G06F 1/04
[52] U.S. Cl. .................................................. 395/559
[58] Field of Search ................................. 395/559, 494, 395/845

[56] References Cited

U.S. PATENT DOCUMENTS 5,583,817   12/1996   Kawaguchi et al. .................. 365/201

FOREIGN PATENT DOCUMENTS

| 64-55854  | 3/1989  | Japan . |
| 3-53342   | 3/1991  | Japan . |
| 3-204951  | 9/1991  | Japan . |
| 4-24833   | 1/1992  | Japan . |
| 5-258599  | 10/1993 | Japan . |
| 7-146331  | 6/1995  | Japan . |

*Primary Examiner*—Thomas M. Heckler
*Attorney, Agent, or Firm*—Oblon, Spivak, McClelland, Maier & Neustadt, P.C.

[57] ABSTRACT

To obtain a semiconductor memory device capable of keeping the internal circuit in active state at all times, without increasing the power consumption during normal operation, and not increasing the number of pins. A burn-in clock generating circuit (1) receives an external clock CLK, a mode signal MODE, and an internal clock INTCLK to output a burn-in clock BICLK to a decoder (5). The burn-in clock BICLK becomes a signal equivalent to the internal clock INTCLK when the mode signal MODE is a fixed signal of H or L indicating normal operation, and becomes a fixed signal of H for indicating activation at all times when the mode signal MODE is a clock at half frequency of the external clock CLK.

10 Claims, 7 Drawing Sheets

SEMICONDUCTOR MEMORY DEVICE

BACKGROUND OF THE INVENTION

1. Field of the Invention

The present invention relates to a synchronous semiconductor memory device.

2. Description of the Background Art

FIG. 8 is an explanatory diagram showing an internal structure of a conventional synchronous semiconductor memory device. As shown in the diagram, an internal clock INTCLK is generated in a pulse signal generating circuit 3 from an external clock CLK supplied from outside. An address signal AD is latched in an address latch circuit 9 at a leading edge of the clock CLK, and is fed into a decoder 5.

The decoder 5 is controlled of activity/inactivity by the internal clock INTCLK, and one word line 10, and a pair of bit lines 11A, 11B are selected from plural word lines in a memory cell array 4, and only one memory cell 8 at their intersecting area is selected (the diagram shows only one word line 10, a pair of bit lines 11A, 11B, and one memory cell 8).

Therefore, the time of selecting the memory cell 8 by selecting (making active) the word line 10 by the decoder 5 is determined by the period in which the internal clock INTCLK indicates activation.

When reading out, the data stored in the selected memory cell 8 is fed into a sense amplifier 6 through the bit line pair 11A, 11B and transfer gate 12, and is amplified in the sense amplifier 6, and stored in a data latch circuit 13. The data stored in the data latch circuit 13 is outputted outside.

When writing in, the incoming write data DQ is stored in the data latch circuit 13 at the rise of the external clock CLK, and is written into the memory cell 8 through a write drive 7, transfer gate 12, and selected bit line pair 11A, 11B.

The active time of the sense amplifier 6 and write driver 7 is also controlled by the internal clock INTCLK same as that of the word line 10. Usually, the period in which the internal clock INTCLK indicates activity is set very short in order to save power consumption.

Being thus constituted hitherto, the action of the decoder 5 has been controlled by giving the internal clock INTCLK short in the period of indicating active state to the decoder 5.

In this constitution, for the active time of the device, the activated time of the decoder 5 and the internal circuit such as memory cell 8 selected by the decoder 5 is shorter, and therefore in burn-in test conducted by activating the memory cell array 4, there was a problem of prolongation of the burn-in time.

SUMMARY OF THE INVENTION

A first aspect of the present invention relates a semiconductor memory device comprising internal clock generating means for receiving an external clock to generate an internal clock on the basis of the external clock, first signal memory means for receiving the external clock and a mode signal, and inputting the mode signal as first store data at the time of a predetermined signal change of the external clock, second signal memory means for receiving the external clock and the first stored data, and inputting the first store data as second store data at the time of the predetermined signal change of the external clock, signal comparing means for receiving the first and second store data, and outputting a comparison result signal on the basis of comparison result between the first store data and the second store data, special clock generating means for outputting one of the internal clock and an activity signal for indicating activation at all limes as a special clock, on the basis of the comparison result signal, and an internal circuit for receiving the special clock, and being in an active state to perform predetermined action when the special clock indicates activation.

A second aspect of the present invention relates to the semiconductor memory device of the first aspect, further comprising an external input pin for inputting an external signal, and switching means interposed between the external input pin and a predetermined power source for controlling conduction and non-conduction on the basis of the comparison result signal, wherein a leak current flows between the external input pin and the predetermined power source when the switching means is conducting.

A third aspect of the present invention relates to the semiconductor memory device of the second aspect, wherein the internal signal comprising a memory cell array having plural word lines, each connecting at least one memory cell, and a decoder for receiving an address signal and the special clock, being in an active slate to select one word line out of the plural word lines on the basis of the address signal when the special clock indicates activation.

A fourth aspect of the present invention relates to the semiconductor memory device of the third aspect, wherein the signal comparing means contains an exclusive OR gate for executing an exclusive OR operation of the first store data and the second store data to output a result of the operation as the comparison result signal, and the special clock generating means contains a NAND gate for receiving a signal related with the comparison result signal as a first input, and the internal clock as a second input, and executing a NAND operation thereof to output a result of the operation as the special clock.

A fifth aspect of the present invention relates to a semiconductor memory device comprising first signal memory means for receiving an external clock and a mode signal, and inputting the mode signal as first store data at the time of a predetermined signal change of the external clock, second signal memory means for receiving the external clock and the first store data, and inputting the first store data as second store data at the time of the predetermined signal change of the external clock, voltage generating means for receiving the first and second store data, and outputting either one of first and second voltages as a control voltage, on the basis of result of comparison between first store data and second store data, and input and output signal control means for receiving K (K≧b 2) first input and output signals and the control voltage, and outputting the K first input and output signals directly as K second input and output signals when the control voltage is the first voltage, or outputting (K−1) or less second input and output signals on the basis of the K first input and output signals when the control voltage is the second voltage.

A sixth aspect of the present invention relates to the semiconductor memory device of the fifth aspect, wherein the first input and output signals are internal output signals to be generated within the semiconductor memory device, and the second input and output signals are external output signals to be outputted outside of the semiconductor memory device.

A seventh aspect of the present invention relates to the semiconductor memory device of the fifth aspect, wherein the first input and output signals are external input signals to be entered from outside the semiconductor memory device, and the second input and output signals are internal input signals to be entered into the semiconductor memory device.

An eighth aspect of the present invention relates to a semiconductor memory device comprising internal clock generating means for receiving an external clock to generate an internal clock on the basis of the external clock, first to N-th (N≧3) signal memory means for commonly receiving the external clock, and respectively storing first to N-th store data, wherein the first signal memory means further receives a mode signal, and inputs the mode signal as the first store data at the time of a predetermined signal change of the external clock, wherein the i-th (i=2~N) signal memory means further receives the (i−1)-th store data, and inputs the (i−1)-th store data as i-th store data at the time of the predetermined signal change of the external clock, first to M-th (M≧2) signal comparing means for each receiving two consecutive data out of the first to N-th stole data as first and second comparative data, and each outputting a comparison result signal on the basis of the result of comparison between the first comparative data and the second comparative data, the combination of the first and second comparative data being different among the first to M-th signal comparing means, special clock generating means for outputting one of the internal clock and an activity signal indicating activation at all times as a special clock, on the basis of M comparison result signals outputted from each of the first to M-th signal comparing means, and an internal circuit far receiving the special clock, and being in active state to perform a predetermined action when the special clock indicates activation.

A ninth aspect of the present invention relaxes to a semiconductor memory device of the eighth aspect, wherein N=4, M=2, the first signal comparing means contains a first exclusive OR gate for executing an exclusive OR operation of the first store data and the second store data as the first and second comparative data, and outputting a result of the operation as a first comparison result signal, the second signal comparing means contains a second exclusive OR gate for executing an exclusive OR operation of the third store data and the fourth store data as the first and second comparative data, and outputting a result of the operation as a second comparison result signal, and the special clock generating means contains a NAND gate for executing a NAND operation of the first operation result and the second operation result, whereby outputting one of the internal clock and the activity signal as the special clock, on the basis of result of operation of the NAND gate.

A tenth aspect of the present invention relates to a semiconductor memory device of the eighth aspect, further comprising an external input pin for inputting an external signal, and switching means-interposed between the external input pin and a predetermined power source for controlling conduction and non-conduction on the basis of the control voltage, wherein a leak current flows between the external input pin and the predetermined power source when the switching means is conducting.

According to the first aspect of the present invention, the semiconductor memory device comprises signal comparing means for receiving the first and second store data stored in the first and second signal store means, and outputting a comparison result signal on the bash of comparison result between the first store data and the second store data, and special clock generating means for outputting one of the internal clock and an activity signal for indicating activation at all times as a special clock, on the basis of the comparison result signal.

In such semiconductor memory device, when a clock operating at a half frequency of the external clock is given as a mode signal, one of the first and second store data is H and the other data is L, and the comparison result signal always indicates disagreement. On the other hand, when fixed data of H or L is given as a mode signal, the first and second store data are same values, either H or L, and the comparison result signal always indicates agreement.

Therefore, depending on whether the clock at half frequency of external clock or fixed data of H or L is given as mode signal, either the internal clock or the activity signal can be selected as special clock.

As a result, the internal circuit is received the activity signal being completely independently of the internal clock as the special clock by means of the mode signal to keep in active state at all times. For example, in the case of burn-in test, by selecting the activity signal by means of the mode signal to set the internal circuit in active state at all times, the burn-in test time can be shortened. In usual operation, by generating an internal clock for shortening the active period and selecting the internal clock by means of the mode signal, and giving it to the internal circuit, a low power consumption is realized.

According to the fifth aspect of the present invention, the semiconductor memory comprises voltage generating means for receiving the first and second stole data, and outputting one of first and second voltages as a control voltage, on the basis of result of comparison between first store data and second store data, and input and output signal control means for receiving K (K>2) first input and output signals and the control voltage, and outputting the K first input and output signals directly as K second input and output signals when the control voltage is the first voltage, or outputting (K−1) or less second input and output signals on the basis of the K first input and output signals when the control voltage is the second voltage.

In such semiconductor memory device, when a clock of a half frequency of the external clock is given as a mode signal, one of the first and second store data is H and the other data is L, and the comparison result signal always indicates disagreement. On the other hand, when fixed data of H or L is given as the mode signal, the first and second slow data are same values, either H or L, and the comparison result signal always indicates agreement.

Therefore, depending on whether a signal at half frequency of external clock, or fixed data of H or L is given as the mode signal, either the first voltage or second voltage can be selected as the control voltage.

As a result, the input and output signal control means is received the second voltage being completely independently of the internal clock as the control voltage by means of the mode signal to decrease the number of signals from K first input and output signals to (K−1) or less second-input and output signals.

According to the eighth aspect of the present invention, the semiconductor memory device comprises first to M-th (M≧2) signal comparing means for each receiving two consecutive data out of the first to N-th store data as first and second comparative data, and each outputting a comparison result signal on the basis of the result of comparison between the first comparative data and the second comparative data, and special clock generating means for outputting one of the internal clock and an activity signal indicating activation at all times as a special clock, on the basis of M comparison result signals outputted from the first to M-th signal comparing means.

In such semiconductor memory device, when a clock of a half frequency of the external clock is given as a mode signal, one of the first and second comparative data outputted from the first to M-th signal comparing means respectively is H and the other data is L, and the comparison result signal indicates disagreement at all times. On the other hand, when fixed data of H or L is given as the mode signal, the first and second comparative data are same values, either H or L, and the comparison result signal indicates agreement all times.

Therefore, depending on whether the clock at half frequency of external clock or fixed data of H or L is given as the mode signal, either the internal clock or the activity signal can be selected as the special clock.

As a result, the internal circuit is received the activity signal being completely independently of the internal clock as the special clock by means of the mode signal to keep in active state at all times. For example, in the case of burn-in test, by selecting the activity signal by means of the mode signal to set the internal circuit in active state at all times, the burn-in test time can be shortened.

Moreover, since the special clock generating means select the special clock on the basis of M comparison result signals from the first to M-th signal comparing means respectively, if an error occurs in part of the M comparison result signals due to noise generated in the mode signal, the error can be corrected by the other comparison result signals.

As a result, if noise occurs in the mode signal, the special clock can be selected correctly.

It is therefore an object of the present invention to provide a semiconductor memory device capable of keeping the internal circuit in active state at all times, without increasing the power consumption during normal operation, and not increasing the number of pins.

These and other objects, features, aspects and advantages of the present invention will become more apparent from the following description of the present invention when taken in conjunction with the accompanying drawings.

DESCRIPTION OF THE PREFERRED EMBODIMENTS

<First preferred embodiment>

Figure 1:
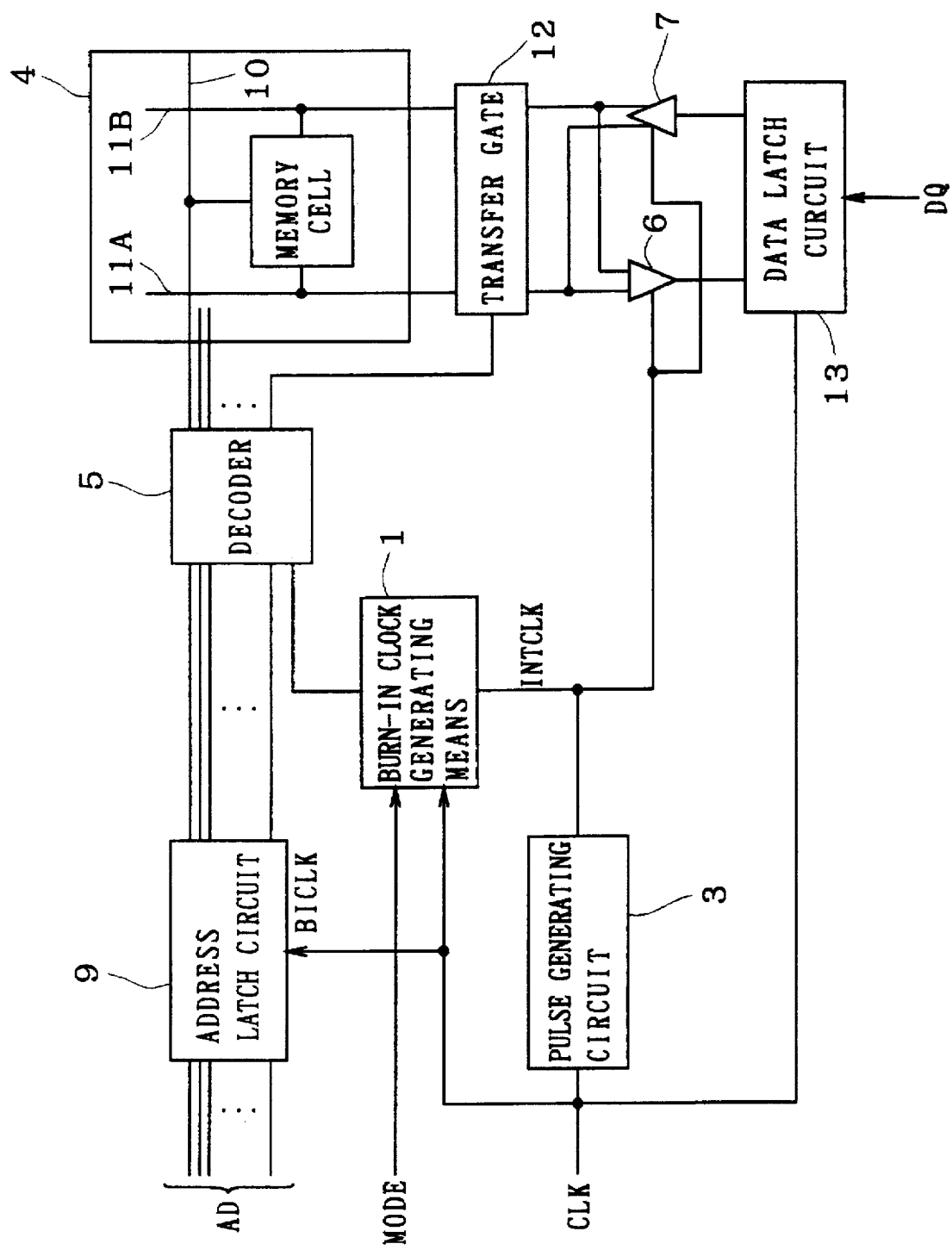
FIG. 1 is an explanatory diagram showing a constitution of a synchronous semiconductor memory device of a first preferred embodiment of the invention.

FIG. 1 is an explanatory diagram showing a constitution of a synchronous semiconductor memory device of a first preferred embodiment of the invention. As shown in the diagram, receiving an external clock CLK entered from outside, a pulse signal generating circuit 3 generates an internal clock INTCLK on the basis of the external clock CLK. An address signal AD is latched in an address latch circuit 9 at the leading edge of the clock CLK, and is fed into a decoder 5.

The decoder 5 is controlled of active or inactive state in synchronism with a burn-in clock BICLK which is a special clock, and selects one word line 10 out of plural word lines in a memory cell array 4, and a pair of bit lines 11A, 11B, on the basis of the address signal AD, and selects only one memory cell 8 at the intersection thereof (the diagram shows only one word line 10, a pair of bit lines 11A, 11B, and one memory cell 8).

Therefore, the time the memory cell 8 being selected as the word line 10 is activated by the decoder 5 is determined by the period of indicating the activation of burn-in clock BICLK.

A burn-in clock generating circuit 1 receives external clock CLK, mode signal MODE, and internal clock INTCLK, and outputs a burn-in clock BICLK to the decoder 5.

When reading out, the data stored in the memory cell 8 is fed into the sense amplifier 6 through bit line pair 11A, 11B and transfer gate 12, and is amplified in the sense amplifier 6, and is stored in a data latch circuit. The data stored in the data latch circuit 13 is issued to outside.

When writing in, the write data DQ entered from outside is stored in the data latch circuit 13 at the rise of the external clock CLK, and is written into the memory cell 8 through a write driver 7, transfer gate 12, and selected bit line pair 11A, 11B.

The active and inactive time of the sense amplifier 6 and write driver 7 is controlled by the internal clock INTCLK.

Figure 2:
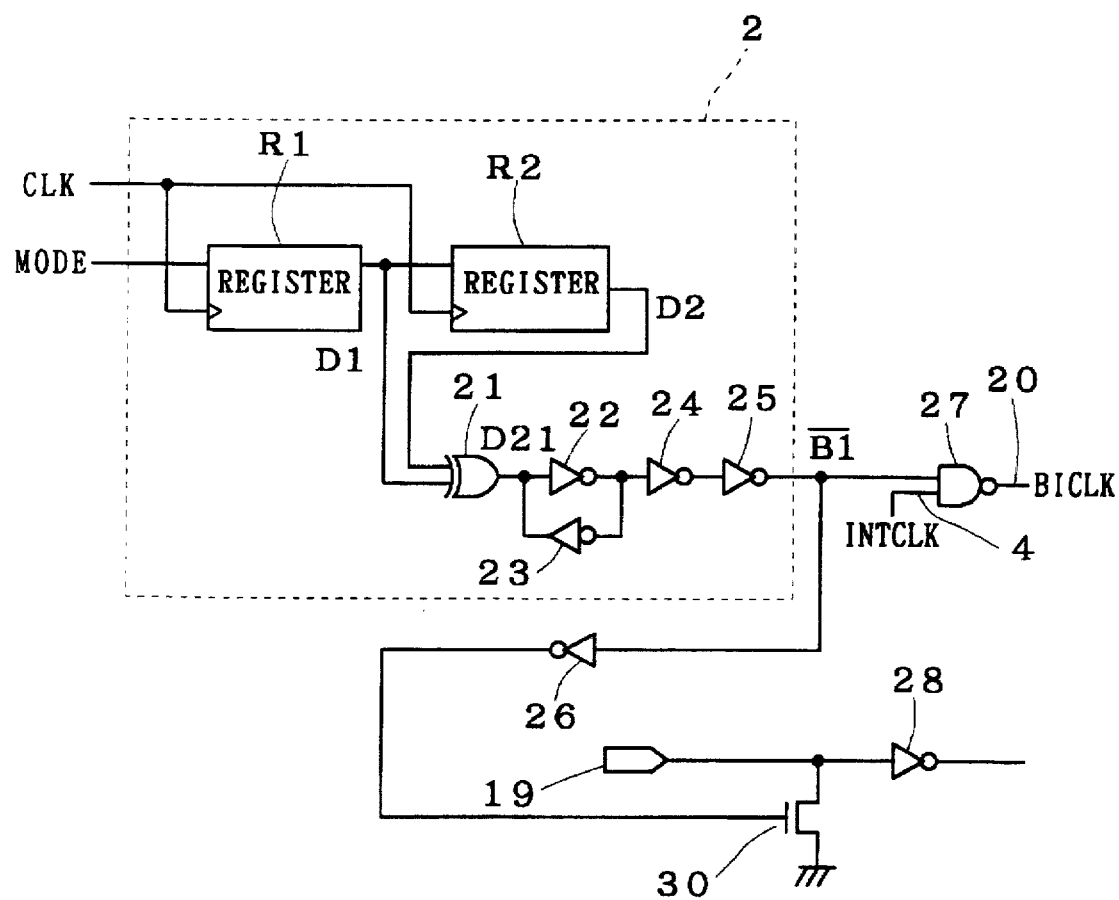
FIG. 2 is a circuit diagram showing an internal constitution of a burn-in clock generating circuit of FIG. 1.

FIG. 2 is a circuit diagram showing an internal constitution of the burn-in clock generating circuit. As shown in the diagram, a register R1 receives external clock CLK and mode signal MODE, and stores the mode signal MODE as store data D1, at the time of the leading edge of external clock CLK.

A register R2 receives external clock CLK and store data D1 of the register R1, and stores the store data D1 as store data D2, at the time of the leading edge of external clock CLK.

An exclusive OR gate 21 receives the store data D1 and store data D2, and executes EXCLUSIVE-OR operation of the store data D1 and store data D2, and outputs its operation result, output data D21, to an inverter 22.

The output data D21 is latched by loop-connected inverters 22 and 23, and becomes burn-in data $\overline{BI}$ through inverters 22, 24, 25. A burn-in data generating circuit 2 is composed of these registers R1, R2, exclusive OR gate 21 and inverters 22 and 25.

The burn-in data $\overline{BI}$ is inputted into an inverter 26 and a NAND gate 27. The NAND gate 27 receives burn-in data $\overline{BI}$ and the internal clock INTCLK, and executes NAND operation of burn-in data $\overline{BI}$ and the internal clock INTCLK to output a burn-in clock BICLK.

The inverter 26 logically inverts the burn-in data $\overline{BI}$, and outputs it into the gate of an NMOS transistor 30. The NMOS transistor 30 has its drain connected to a BW pad 19 which is one of input terminals, and its source grounded. The BW pad 19 receives an input signal from outside, and outputs this input signal inside through an input buffer 28.

Figure 3:
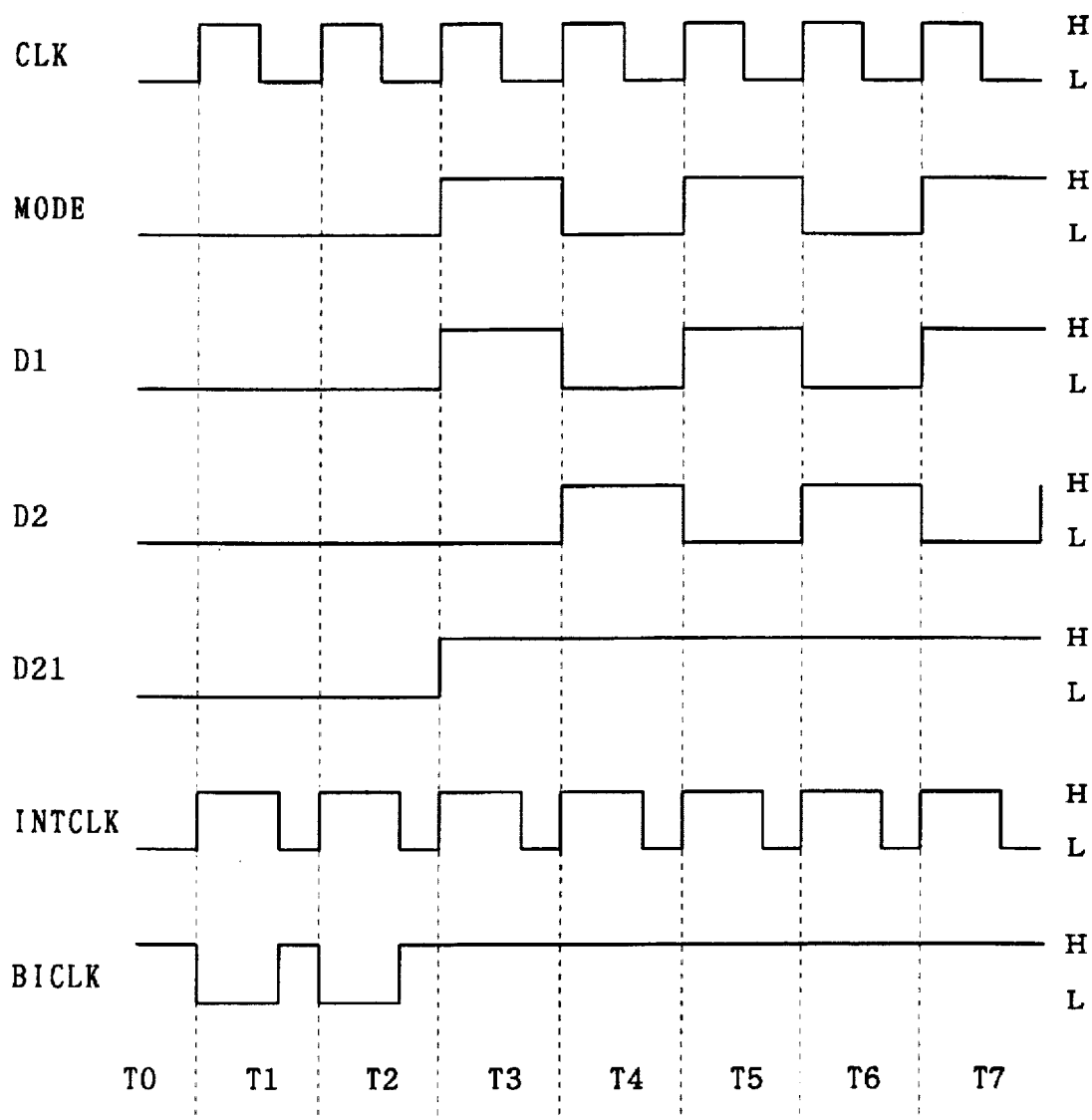
FIG. 3 is a waveform diagram showing tho operation of the semiconductor memory device of a first preferred embodiment.

FIG. 3 is a timing chart showing the operation of the burn-in clock generating circuit 1. As shown in the diagram, the mode signal MODE is a fixed signal of L indicating an ordinary operation from period. T0 to T2, and after period T3, it becomes a clock of half frequency of external clock CLK indicating burn-in test operation.

In period T1, T2, too, the mode signal MODE is L, and both store data D1 and store data D2 are L, and hence the output data D21 of the exclusive OR gate 21 is also L.

As a result, the burn-in data $\overline{BI}$ obtained from the output data D21 through the inverters 22, 24, 25 is H, and hence an inverted value of the internal clock INTCLK is outputted as burn-in clock BICLK. Therefore, the rise time of word line can be controlled by INTCLK.

In period T3 to T7, the mode signal MODE is a half frequency of external clock CLK, and the store data D1 change from H to L, H, L and H in period T3 to T7, and the store data D2 changes from L to H, L, H and L in period T3 to T7, and therefore the output data D21 of the exclusive OR gate 21 is H at all times.

Consequently, the burn-in data $\overline{BI}$ is L, and the burn-in clock BICLK as the output of the NAND gate 27 is fixed at H. Therefore, the decoder 5 is in active state at all times, and the word line selected by this decoder 5 is also in active state at all times.

That is, as shown in FIG. 3, supposing period T0 to T2 as normal operation period, and period T3 to T7 as burn-in operation period, during normal operation, the burn-in clock BICLK equivalent to the internal clock INTCLK is given to the decoder 5 to enable operation at low power consumption, and during burn-in test, the burn-in clock BICLK of fixed voltage H is given to the decoder 5 regardless of the waveform of the internal clock INTCLK, and the memory cell array 4 is set in active state at all times, so that the burn-in test can be completed in a short time. Moreover, it is not necessary to add new input pins for input of burn-in clock BICLK.

In FIG. 3, for the sake of convenience, the external clock CLK and rise of mode signal MODE are synchronized, but in order to input the store data securely from the registers R1 and R2, it is preferred to raise (lower) the mode signal MODE before predetermined period of rise of external clock CLK.

Besides, during burn-in test, the burn-in data $\overline{BI}$ is L, and this burn-in data $\overline{BI}$ is inverted by the inverter 26, and is applied to the gate of the NMOS transistor 30, thereby turning on the NMOS transistor 30.

Therefore, by connecting the tester pin to the BW pad 19, and detecting whether leak current flows from the tester to the grounding level through the NMOS transistor 30, it is detected whether normal operation or burn in test.

Incidentally, the BW pad 19 is an input pin provided preliminarily in the synchronous semiconductor memory device in order to control the bit width becoming effective by controlling the driver 7, and in normal operation, the burn-in data $\overline{BI}$ is H and the NMOS transistor 30 is turned off, and hence by applying a control signal from the BW pad 19, the number of effective bits of the driver 7 can be controlled.

<Second preferred embodiment>

Figure 4:
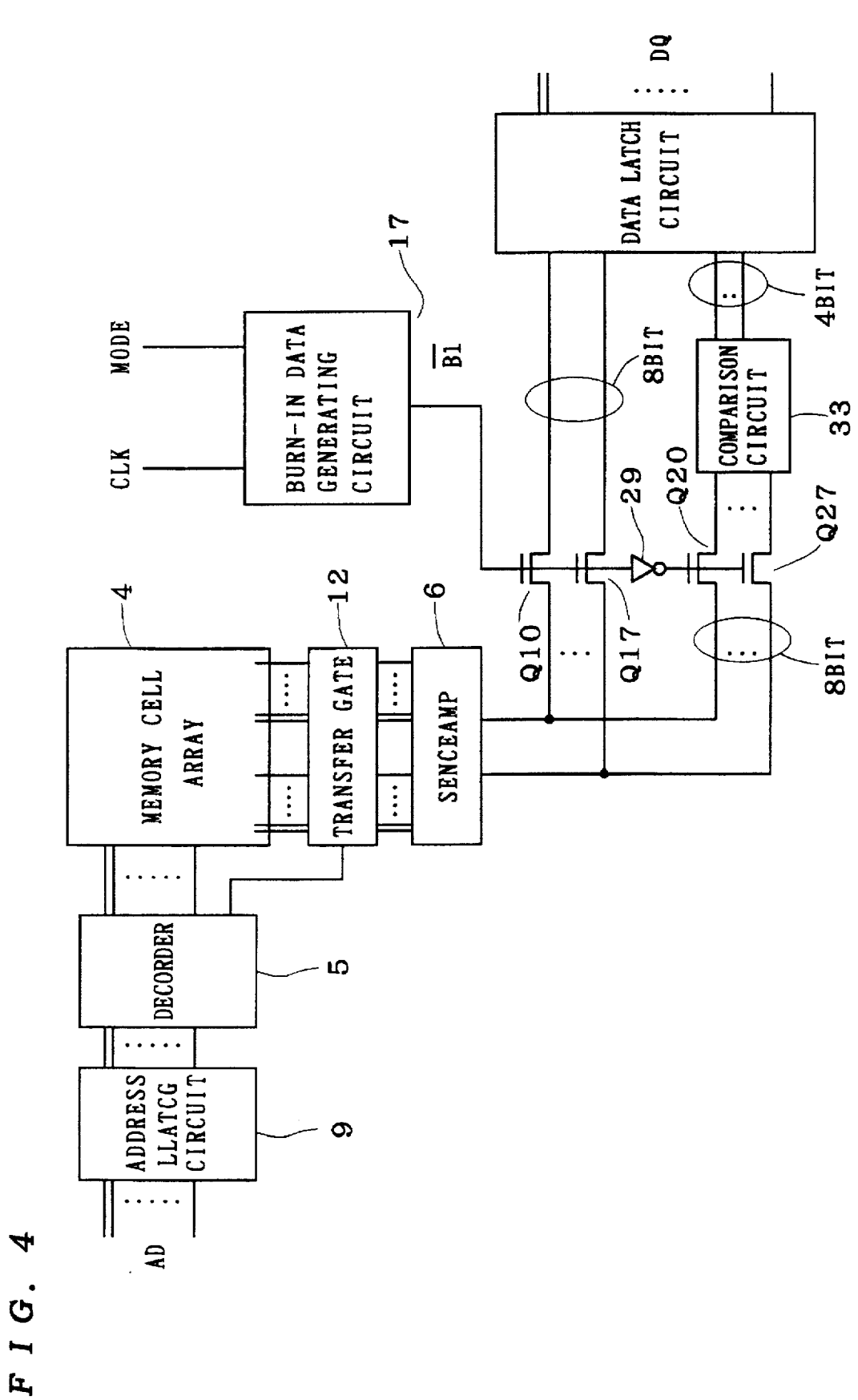
FIG. 4 is an explanatory diagram showing a constitution of a synchronous semiconductor memory device of a second preferred embodiment of the invention.
Figure 5:
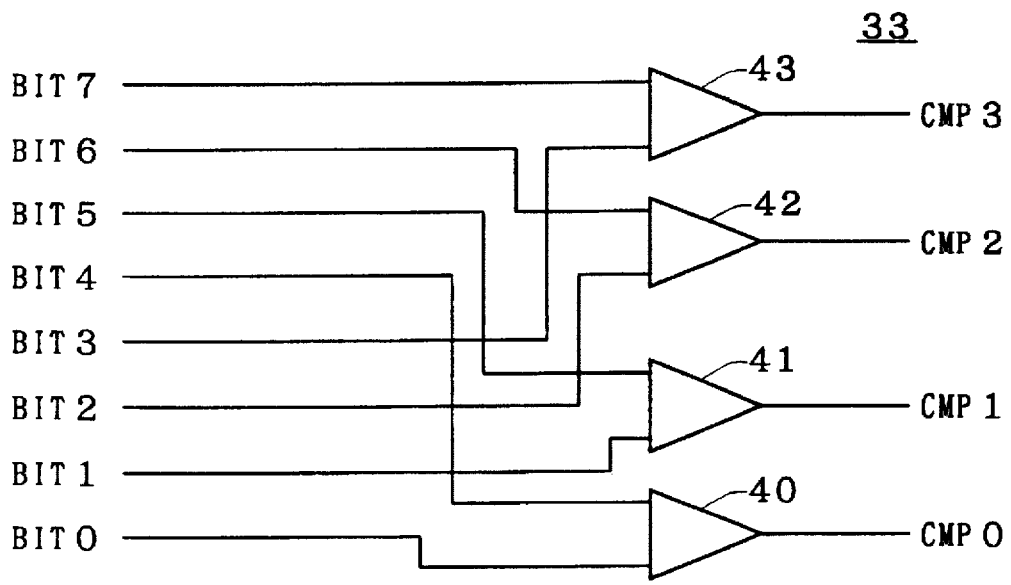
FIG. 5 is a circuit diagram showing an internal constitution of a comparison circuit in FIG. 4.

FIG. 4 is an explanatory diagram showing a constitution of a synchronous semiconductor device of a second preferred embodiment of the invention. The address latch circuit 9, decoder 5, memory cell array 4, and transfer gate 12 are same as in first preferred embodiment, and their explanation is omitted herein.

An eight-bit output of a sense amplifier 6 is applied to a data latch circuit 13 through eight NMOS transistors Q10 to Q17, and is also given to a comparison circuit 33 through eight NMOS transistors Q20 to Q27.

The comparison circuit 33 is composed of four comparators 40 to 43, and receives a 8 bits output BIT0 to BIT7 of the sense amplifier 6, and outputs a 4 ; bits comparison output CMP0 to CMP3 to the data latch circuit 13. That is, the comparator 40 compares bit outputs BIT0 and BIT4 of the sense amplifier 6, and outputs a comparison output CMP0, the comparator 41 compares bit outputs BIT1 and BIT5 of the sense amplifier 6, and outputs a comparison output CMP1, the comparator 42 compares bit outputs BIT2 and BIT6 of the sense amplifier 6, and outputs a comparison output CMP2, the comparator 43 compares bit outputs BIT3 and BIT7 of the sense amplifier 6, and outputs a comparison output CMP3.

The data latch circuit 13 outputs 8 bits output data DQ. At this time, when the NMOS transistors Q10 to Q17 are in ON state and the NMOS transistors Q20 to Q27 are in OFF state, the outputs BIT0 to BIT7 of the sense amplifier 6 are directly outputted as output data DQ, and to the contrary when the NMOS transistors Q10 to Q17 are in OFF state and the NMOS transistors Q20 to Q27 are in ON state, the outputs CMP0 to CMP3 of the comparison circuit 33 are outputted by assigning to predetermined 4 bits of 8 bits output data DQ.

To the gates of the transistors Q10 to Q17, a burn-in data $\overline{BI}$ outputted from the burn-in data generating circuit 2 (see FIG. 2) is given, and the burn-in data $\overline{BI}$ is given to the gates of the transistors Q20 to Q27 through an inverter 29.

In such constitution, in normal operation, by applying the fixed voltage of H or L to the burn-in data generating circuit 2 as the mode signal MODE, the burn-in data $\overline{BI}$ becomes H. Therefore, the NMOS transistors Q10 to Q17 are turned on, while the NMOS transistors (Q20 to Q27 are turned off. The 8 bits output BIT0 to BIT7 of the sense amplifier 6 is directly given to the data latch circuit 13. Consequently, the data latch circuit 13 outputs the eight-bit output BIT0 to BIT7 of the sense amplifier 6 as output data DQ.

On the other hand, during test operation, by giving a signal of half frequency of external clock CLK to the burn-in data generating circuit 2 as the mode signal MODE, the burn-in data $\overline{BI}$ becomes L. Therefore, the NMOS transistors Q10 to Q17 are turned off, and the NMOS transistors Q20 to Q27 are turned on, so that the 4 bits output CMP0 to CMP3 of the comparison circuit 33 is given to the data latch circuit 13. Sequentially, the data latch circuit 13 outputs the 4 bits output CMP0 to CMP3 of the comparison circuit 33 by assigning to predetermined 4 bits of 8 bits output data DQ.

Thus, during test operation, by verifying only predetermined 4 bits of 8 bits output data DQ, agreement or disagreement of upper 4 bits and lower 4 bits 8 bits output BIT0 to BIT7 can be verified. That is, the 8 bits output BIT0 to BIT7 being the 8 bits internal signal can be contracted into 4 bits external output signal (predetermined 4 bits of output data DQ).

In second preferred embodiment, by contracting eight internal output signals, four external signals are delivered, but not limited to this, of course, K (K≧2) internal output signals can be contracted, and (K–1) or less external output signals can be outputted. Similarly, K external input signals may be taken in by converting into (K–1) or less internal input signals.

<Third preferred embodiment>

Figure 6:
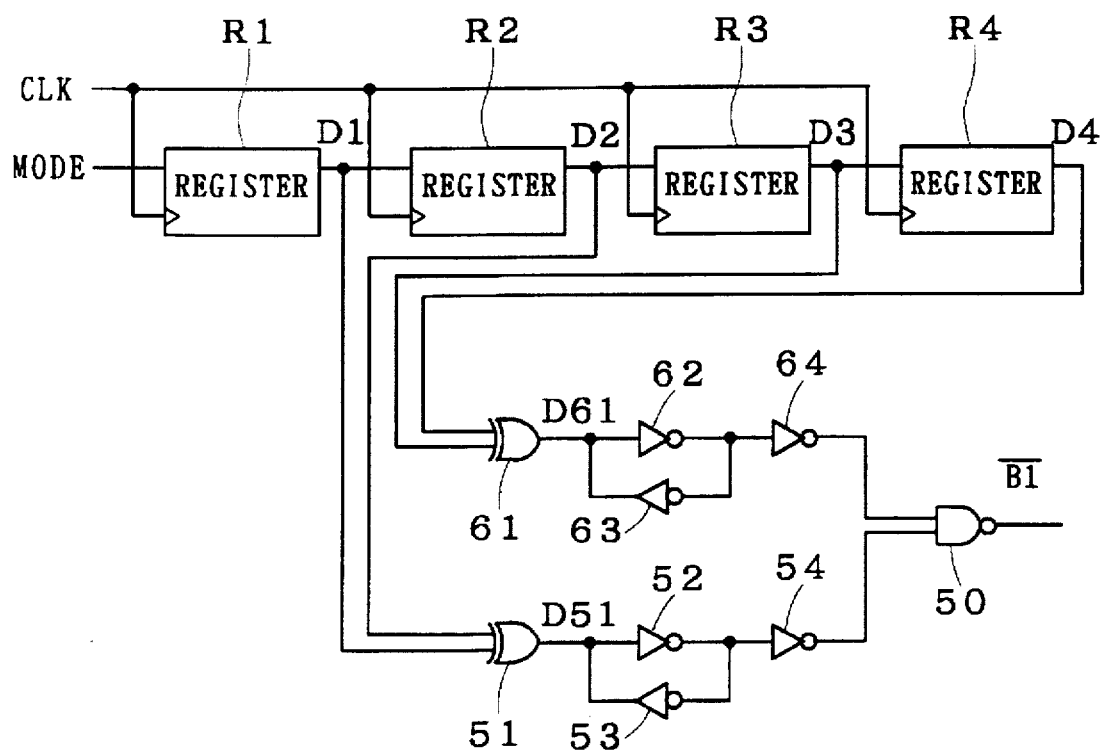
FIG. 6 is a circuit diagram showing an internal constitution of a burn-in data generating circuit of a synchronous semiconductor memory device of the third preferred embodiment of the invention.

FIG. 6 is a circuit diagram showing an internal constitution of a burn-in data generating circuit in a burn-in clock generating circuit in a synchronous semiconductor memory device of a third preferred embodiment of the invention. The general constitution of third preferred embodiment is same as the general constitution of first preferred embodiment shown in FIG. 1, and the constitution of the burn-in clock generating circuit other than the burn-in data generating-circuit is same as the constitution of the burn-in clock generating circuit in first preferred embodiment shown in FIG. 2.

As shown in FIG. 6, a register R1 receives external clock CLK and mode signal MODE, and stores the mode signal MODE as store data D1, at the time of the leading edge of external clock CLK.

A register R2 receives external clock CLK and store data D1 of the register R1, and stores the store data D1 as store data D2, at the time of the leading edge of external clock CLK.

A register R3 receives external clock CLK and store data D2 of the register 2, and stores the store data D2 as store data D3, at the time of the leading edge of external clock CLK.

A register R4 receives external clock CLK and store data D3 of the register R3, and stores the store data D3 as store data D4, at the time of the leading edge of external clock CLK.

An exclusive OR gate 51 receives the store data D1 and stole data D2, and executes EXCLUSIVE-OR operation of the store data D1 and store data D2 to output its output data D51, to an inverter 52.

The output data D51 is latched by loop-connected inverters 52 and 53, and is outputted into one input of the NAND gate 50 through inverters 52, 54.

An exclusive OR gate 61 receives the store data D3 and store data D4, and executes EXCLUSIVE-OR operation of the store data D3 and store data D4 to output its output data D61, to an inverter 62.

The output data D61 is latched by loop-connected inverters 62 and 63, and is outputted into other input of the NAND gate 50 through inverters 62, 64.

The NAND gate 50 executes NAND operation of the outputs of the inverters 54, 64, and outputs burn-in data $\overline{BI}$.

In such constitution, same as in first preferred embodiment, in normal operation, the mode signal MODE is a fixed signal of H or L, but in burn-in test operation, it is a signal at half frequency of external clock CLK.

In normal operation, when the mode signal MODE is L, all store data D1 to D4 are L, and hence the output data D51 and D61 of the exclusive OR gates 51 and 62 are L.

As a result, the burn-in data $\overline{BI}$ obtained by NAND operation of the output data D51 and output data D61 by NAND gate 50 is H.

Thereafter, same as in first preferred embodiment, an inverted value of internal clock INTCLK is outputted as burn-in clock BICLK. Therefore, the rise time of word line be controlled by INTCLK.

In burn-in test, the mode signal MODE is set at half frequency of external clock CLK, and when the store data D1 changes from H to L, H, L, H, . . . in every cycle of external clock CLK, the store data changes from L to H, L, H, L, . . . , store data D3 changes from H to L, H, L, H, . . . , and store data D4 changes from L to H, L, H, L, . . . .

As a result, the outputs of the exclusive OR gates 51 and 52 both becomes H, and the burn-in data $\overline{BI}$ obtained by NAND operation of the output data D51 and output data D61 by NAND gate 50 is L.

Thereafter, same as in first preferred embodiment, a fixed signal of H is outputted as burn-in clock BICLK. Therefore, the selected word line in the memory cell array 4 may be kept in active state at all times.

In this way, when the synchronous semiconductor memory device is constituted as shown in FIG. 1, by using the burn-in clock generating circuit 1 composed of the burn-in data generating circuit 2 in third preferred embodiment, same as in first preferred embodiment, in normal operation, operation at low power consumption is realized by applying a burn-in clock BICLK equivalent to an internal clock INTCLK to the decoder 5, and in burn-in test, by applying a burn-in block BICKL of fixed voltage H to the decoder 5 regardless of the waveform of internal clock INTCLK, the burn-in test can be terminated in a short time by keeping the memory cell array 4 in active state at all times. What is more, new input pins are not required for control of burn-in clock BICLK.

Figure 7:
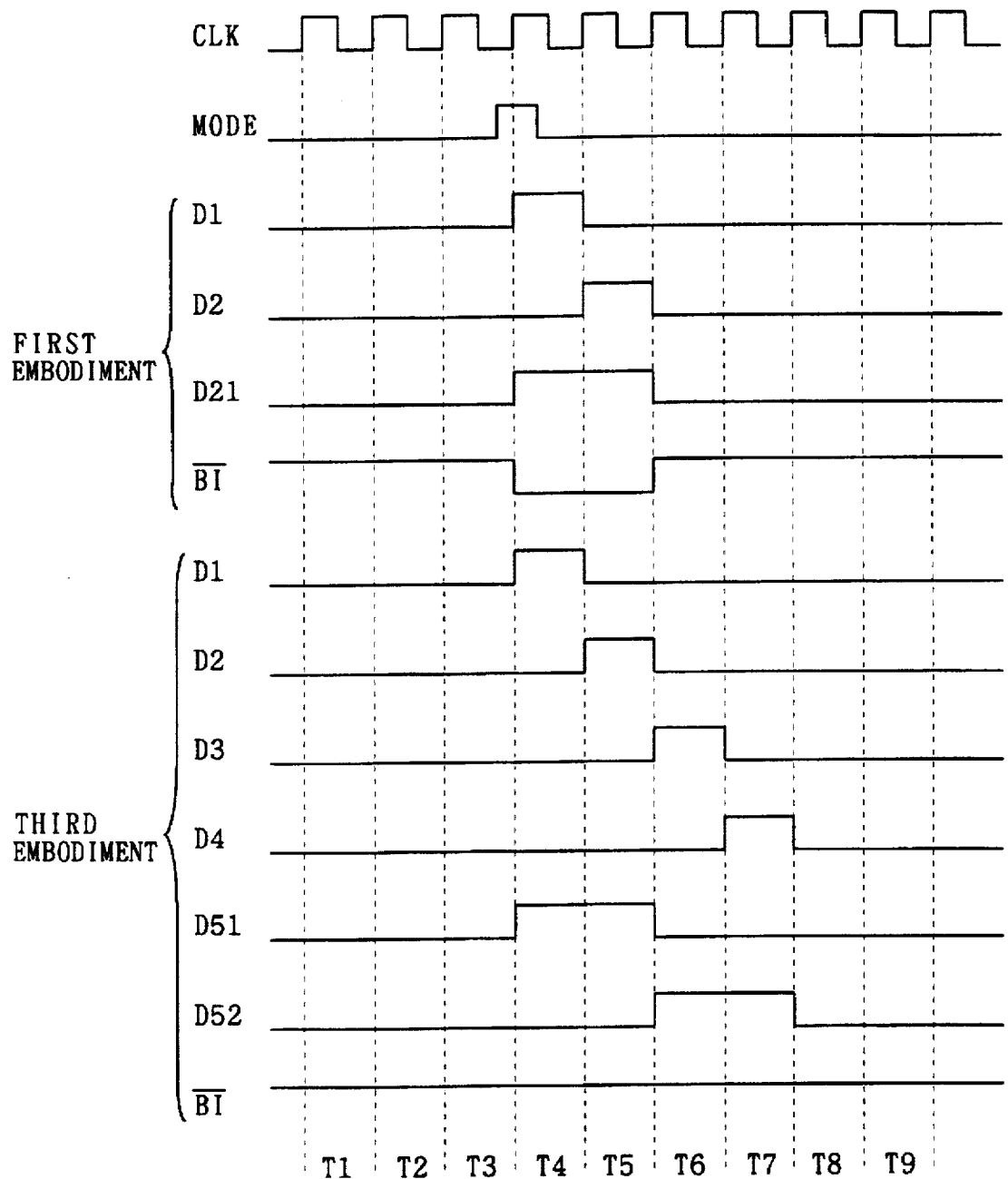
FIG. 7 is a waveform diagram showing the operation of the semiconductor memory device of a third preferred embodiment.
Figure 8:
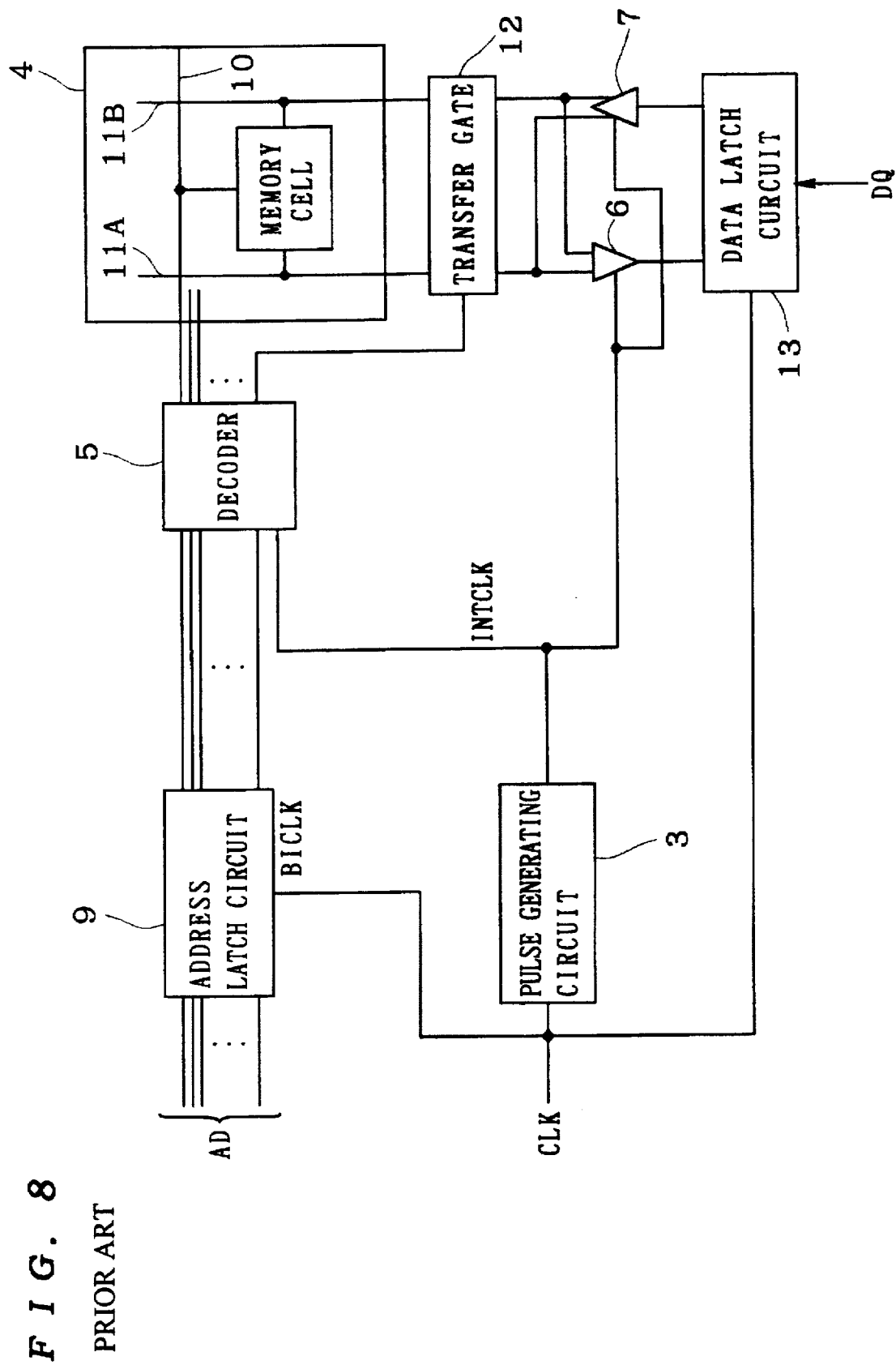
FIG. 8 is an explanatory diagram showing a constitution of a conventional synchronous semiconductor memory device.

FIG. 7 is a timing chart showing the superiority of the burn-in data generating circuit 2 in third preferred embodiment. The example shown in FIG. 7 shows the operation of becoming H in period T3 to T4, due to generation of noise in mode signal MODE, during normal operation with the mode signal MODE fixed at L.

In the burn-in clock generating circuit 1 of first preferred embodiment shown in FIG. 2, in period T4, H caused by noise is stored as store data D1 of the register R1, and in period T5, the store data D1 of H is stored as store data D2 of the register R2.

As a result, in period T4, T5, the output data D21 of exclusive OR gate 21 becomes H, and the burn-in data $\overline{BI}$ becomes L by mistake, and therefore this period involves a problem of fixing of burn-in clock BICLK at H.

On the other hand, in the burn-in clock generating circuit 1 using the burn-in data generating circuit 2 shown in FIG. 6, in period T4, H caused by noise is stored as store data D1 of the register R1; in period T5, the store data D1 of H is stored as store data D2 of the register R2; in period T6, the store data D2 of H is stored as stored data D3 of the resister R3; and in period T7,the store data D3 of H is stored as store data D4 of the register R4.

In period T4, T5, the output data D51 of the exclusive OR gate 51 becomes H, but since the output data D61 of the exclusive OR gate 61 maintains L, the burn-in data $\overline{BI}$ which is the output of the NAND gate 50 is also maintained at H in this period.

In period T6, T7, the output data D61 of the exclusive OR gate 61 becomes H, but since the output data D51 of the exclusive OR gate 51 returns to L, the burn-in data $\overline{BI}$ which is the output of the NAND gate 50 is also maintained at H in this period.

In this way, if noise is caused in the mode signal MODE during normal operation, and an error is caused in the burn-in data $\overline{BI}$ in first preferred embodiment, correct burn-in data $\overline{BI}$ can be outputted in third preferred embodiment.

In this preferred embodiment, meanwhile, the number of registers connected in series is four, but the number of registers N is arbitrary as far as three or more.

It may be hence constituted so as to have first to M-th (M≧2) signal comparing means (corresponding to the exclusive OR gates in the embodiments) for each outputting comparison result signals, on the basis of the comparison result of two consecutive data out of first to N-th store data which are store data of N registers, to consecutive N registers.

As a matter of course, however, the combination of the first and second comparative must be different among the first to M-th signal comparing means.

While the invention has been shown and described in detail, the foregoing description is in all aspects illustrative and not restrictive. It is therefore understood that numerous modifications and variations can be devised without departing from the scope of the invention.

We claim:

1. A semiconductor memory device comprising: internal clock generating means for receiving an external clock, and generating an internal clock from said external clock, said internal clock varying between a first level and a second level;

first signal memory means for receiving said external clock and a mode signal, and inputting said mode signal as a first stored data when a predetermined signal change of said external clock occurs;

second signal memory means for receiving said external clock and said first stored data, and inputting said first stored data as a second stored data when said predetermined signal change of said external clock occurs;

signal comparing means for receiving said first and second stored data, and for outputting a comparison result signal after comparing said first stored data and said second stored data;

special clock generating means for receiving said internal clock and said comparison result signal for outputting, based on said comparison result signal, a special clock comprising one of said internal clock and a signal being fixed at said first level; and an internal circuit for receiving said special clock, and being in an active state to perform a predetermined action when said special clock is at said first level.

2. The semiconductor memory device of claim 1, further comprising:

an external input pin for inputting an external signal; and switching means interposed between said external input pin and a predetermined power source, said switching means for controlling conduction and non-conduction of said external signal through said external input pin based on said comparison result signal, wherein a leak current flows between said external input pin and said predetermined power source when said switching means is conducting.

3. The semiconductor memory device of claim 1, wherein said internal circuit comprising: a memory cell array having plural word lines each connecting at least one memory cell; and a decoder for receiving an address signal and said special clock, said decoder being in an active state so as to select one word line out of said plural word lines based on said address signal when said special clock is at said first level.

4. The semiconductor memory device of claim 1, wherein:

said signal comparing means comprising an exclusive OR gate for executing an exclusive OR operation on said first stored data and said second stored data and outputting a result of the exclusive operation as said comparison result signal; and said special clock generating means comprises a NAND gate for receiving a signal that is logically related to said comparison result signal as a first input, and said internal clock as a second input, and executing a NAND operation thereon and outputting a result of the NAND operation as said special clock.

5. A semiconductor memory device comprising:

first signal memory means for receiving an external clock and a mode signal, and inputting said mode signal as a first stored data when a predetermined signal change of said external clock occurs;

second signal memory means for receiving said external clock and said first stored data, and inputting said first stored data as a second stored data when said predetermined signal change of said external clock;

voltage generating means for receiving said first and second stored data, and outputting one of a first voltage and a second voltages as a control voltage by comparing said first stored data and second stored data; and input and output signal control means for receiving K (K ≧2) first signals and said control voltage, and outputting said K first signals directly as K second signals when said control voltage is at said first voltage, and for outputting (K−1) or less third signals taken from said K first signals when said control voltage is at said second voltage.

6. The semiconductor memory device of claim 5, wherein said first signals are internal output signals generated within said semiconductor memory device, and said second signals are external output signals outputted outside of said semiconductor memory device.

7. The semiconductor memory device of claim 5, wherein said first signals are external input signals entered from outside said semiconductor memory device, and said second signals are internal input signals entered into said semiconductor memory device.

8. A semiconductor memory device comprising:

internal clock generating means for receiving an external clock to generate an internal clock based on said external clock, said internal clock varying between a first level and a second level;

first to N-th (N≧3) signal memory means for commonly receiving said external clock, and respectively storing first to N-th stored data, said first signal memory means for receiving a mode signal and inputting said mode signal as said first stored data when a predetermined signal change of said external clock occurs, wherein an i-th (i=2 to N) signal memory means of said first to N-th signal memory means further receives an (i−1)-th stored data, and inputs said (i−1)-th stored data as the i-th stored data when a predetermined signal change of said external clock occurs;

first to M-th (M≧2) signal comparing means each for receiving two consecutive data out of said first to N-th stored data as a first comparative data and a second comparative data, and each for outputting a respective comparison result signal based on comparing said first comparative data and said second comparative data, a combination of said first and second comparative data being different among said first to M-th signal comparing means;

special clock generating means for receiving said internal clock and M comparison result signals outputted from each of said first to M-th signal comparison means, for outputting, a special clock, one of said internal clock and signal being fixed at said first level based on said first to M-th comparison result signals; and an internal circuit for receiving said special clock, and being in active state to perform a predetermined action when said special clock is at said first level.

9. A semiconductor memory device of claim 8, wherein:

N=4, and M=2;

said first signal comparing means contains a first exclusive OR gate for executing an exclusive OR operation on said first stored data and said second stored data as said first and second comparative data, and outputting a result of the exclusive or operation as a first comparison result signal;

said second signal comparing means comprises a second exclusive OR gate for executing a second exclusive OR operation of said third stored data and said fourth stored data as said first and second comparative data, and outputting a result of the second exclusive OR operation as a second comparison result signal; and said special clock generating means comprises a NAND gate for executing a NAND operation on said first operation result and said second operation result, and outputting one of said internal clock and a signal being fixed at said first level as said special clock based on a result of said NAND operation.

10. A semiconductor memory device of claim 8, further comprising:

an external input pin for inputting an external signal; and switching means interposed between said external input pin and a predetermined power source, said switching means for controlling conduction and non-conduction of said external signal through said external input pin based on said first to M-th comparison result signals, wherein a leak current flows between said external input pin and said predetermined power source when said switching means is conducting.

* * * * *

UNITED STATES PATENT AND TRADEMARK OFFICE
CERTIFICATE OF CORRECTION

PATENT NO. : 5,708,802
DATED : January 13, 1998
INVENTOR(S) : Chikayoshi Morishima et al It is certified that error appears in the above-indentified patent and that said Letters Patent is hereby corrected as shown below:

The title page, showing an illustrative figure, should be deleted and substitute therefor the attached title page.

Delete Figures 1,2,4,6,8, and substitute therefor the Figures, consisting of Figures 1,2,4,6 and 8 as shown on the attached pages.

Signed and Sealed this

Eleventh Day of August 1998

Attest:

BRUCE LEHMAN

Attesting Officer

Commissioner of Patents and Trademarks

United States Patent [19]

Morishima et al.

[11] Patent Number: 5,708,802
[45] Date of Patent: Jan. 13, 1998

[54] SEMICONDUCTOR MEMORY DEVICE

[75] Inventors: Chikayoshi Morishima; Shigeki Ohbayashi, both of Tokyo, Japan

[73] Assignee: Mitsubishi Denki Kabushiki Kaisha, Tokyo, Japan

[21] Appl. No.: 564,651

[22] Filed: Nov. 29, 1995

[51] Int. Cl.⁶ .................................................. G06F 1/04
[52] U.S. Cl. ............................................................ 395/559
[58] Field of Search ................................. 395/559, 494, 395/845

[56] References Cited

U.S. PATENT DOCUMENTS 5,583,817  12/1996  Kawaguchi et al. .................. 365/201

FOREIGN PATENT DOCUMENTS

| 64-55854 | 3/1989 | Japan . |
| 3-53342 | 3/1991 | Japan . |
| 3-204951 | 9/1991 | Japan . |
| 4-24833 | 1/1992 | Japan . |
| 5-258599 | 10/1993 | Japan . |
| 7-146331 | 6/1995 | Japan . |

*Primary Examiner*—Thomas M. Heckler
*Attorney, Agent, or Firm*—Oblon, Spivak, McClelland, Maier & Neustadt, P.C.

[57] ABSTRACT

To obtain a semiconductor memory device capable of keeping the internal circuit in active state at all times, without increasing the power consumption during normal operation, and not increasing the number of pins. A burn-in clock generating circuit (1) receives an external clock CLK, a mode signal MODE, and an internal clock INTCLK to output a burn-in clock BICLK to a decoder (5). The burn-in clock BICLK becomes a signal equivalent to the internal clock INTCLK when the mode signal MODE is a fixed signal of H or L indicating normal operation, and becomes a fixed signal of H for indicating activation at all times when the mode signal MODE is a clock at half frequency of the external clock CLK.

10 Claims, 7 Drawing Sheets

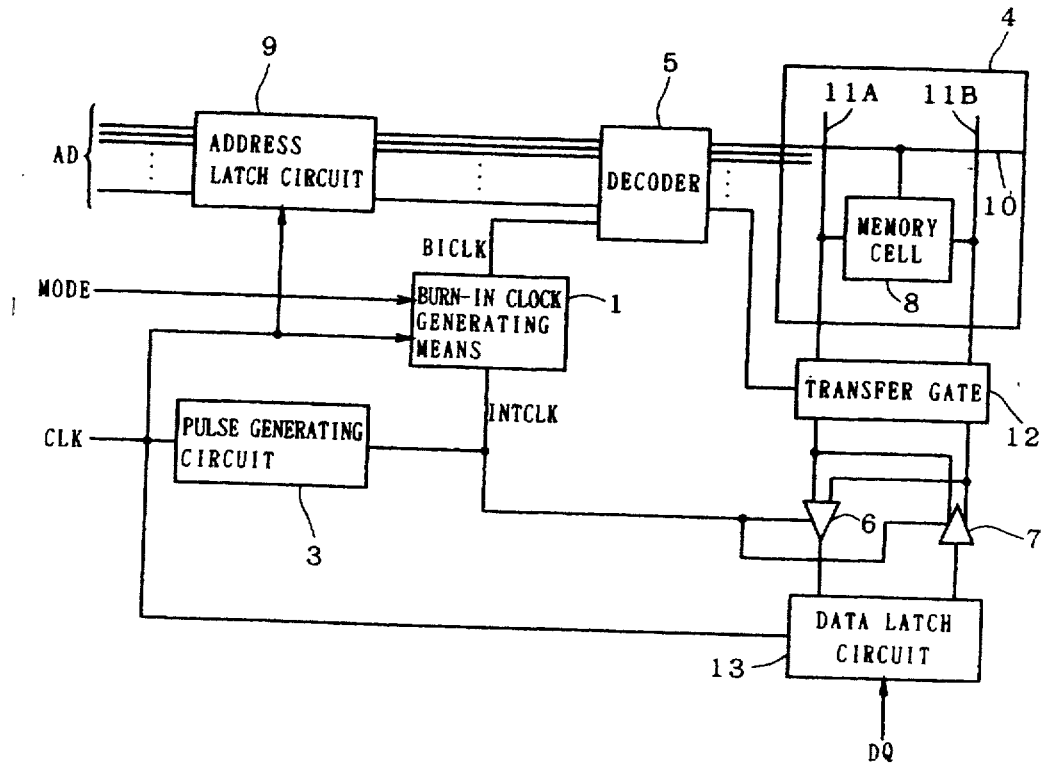

UNITED STATES PATENT AND TRADEMARK OFFICE
CERTIFICATE OF CORRECTION

PATENT NO. : 5,708,802
DATED : January 13, 1998
INVENTOR(S) : Chikayoshi Morishima et al Page 3 of 9

It is certified that error appears in the above-indentified patent and that said Letters Patent is hereby corrected as shown below:

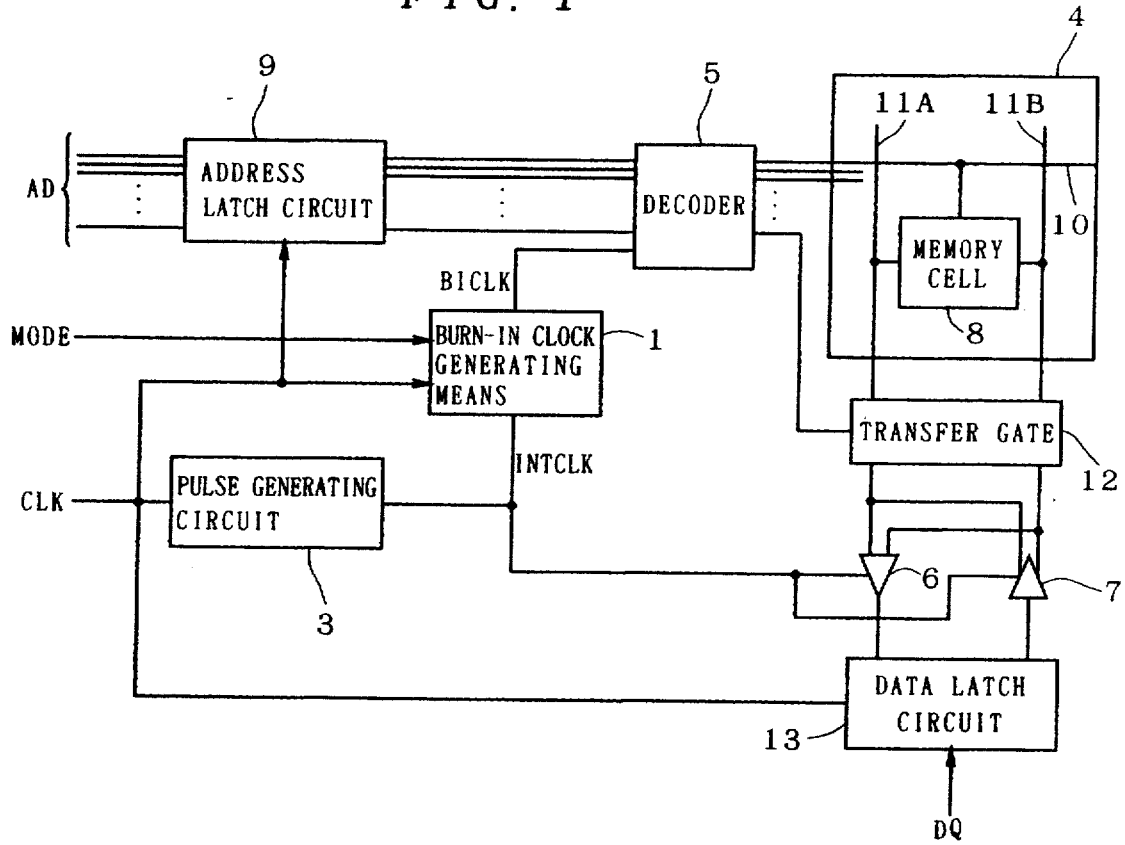

FIG. 1

UNITED STATES PATENT AND TRADEMARK OFFICE
CERTIFICATE OF CORRECTION

PATENT NO. : 5,708,802
DATED : January 13, 1998
INVENTOR(S) : Chikayoshi Morishima et al It is certified that error appears in the above-indentified patent and that said Letters Patent is hereby corrected as shown below:

*FIG. 2*

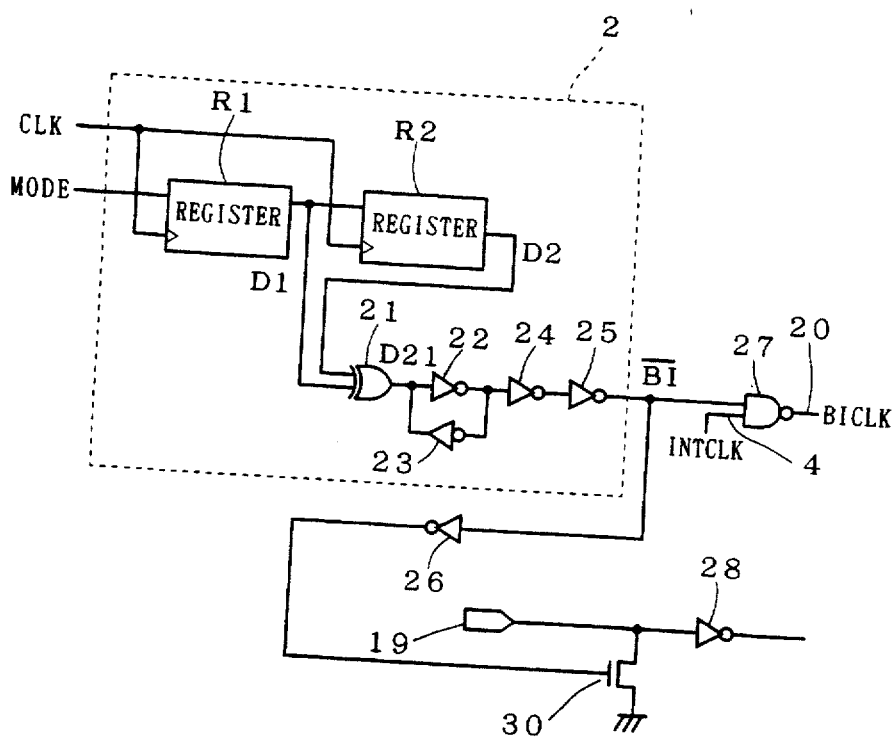

UNITED STATES PATENT AND TRADEMARK OFFICE
CERTIFICATE OF CORRECTION

PATENT NO. : 5,708,802
DATED : January 13, 1998
INVENTOR(S) : Chikayoshi MOrishima et al It is certified that error appears in the above-indentified patent and that said Letters Patent is hereby corrected as shown below:

*FIG. 4*

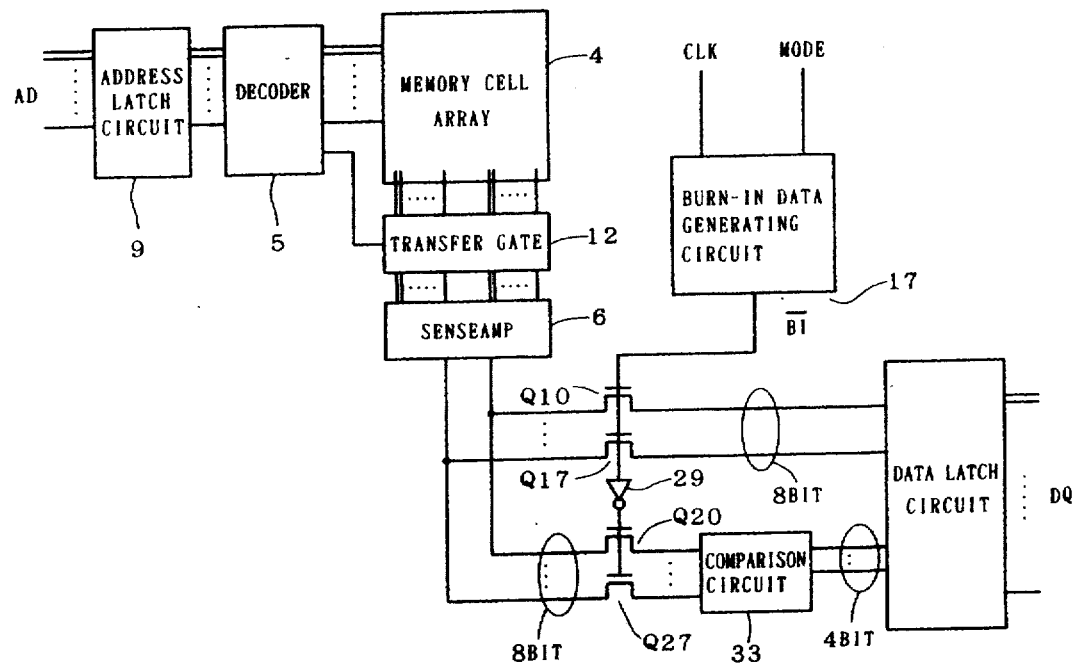

UNITED STATES PATENT AND TRADEMARK OFFICE
CERTIFICATE OF CORRECTION

PATENT NO. : 5,708,802
DATED : January 13, 1998
INVENTOR(S) : Chikayoshi Morishima et al It is certified that error appears in the above-indentified patent and that said Letters Patent is hereby corrected as shown below:

FIG. 6

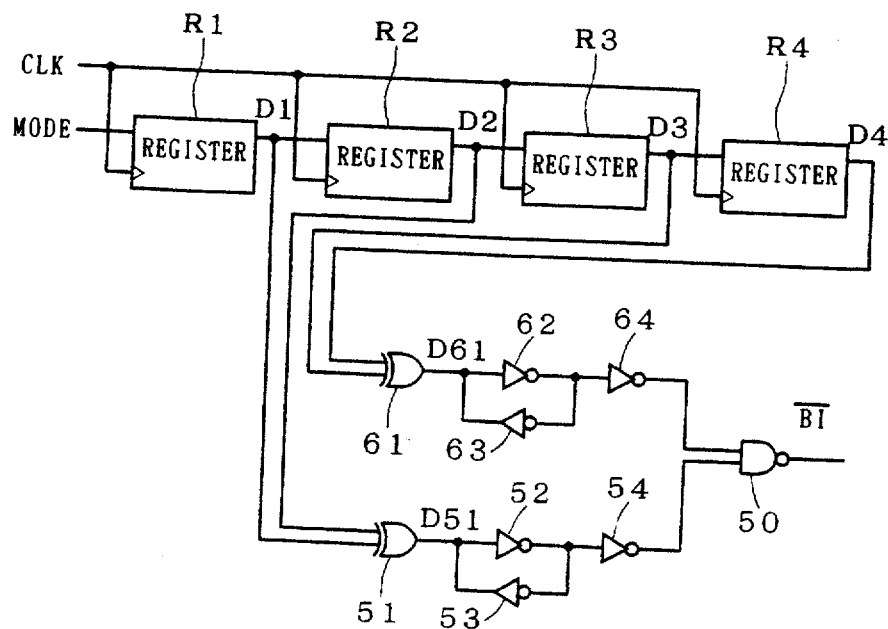

UNITED STATES PATENT AND TRADEMARK OFFICE
CERTIFICATE OF CORRECTION

PATENT NO. : 5,708,802
DATED : January 13, 1998
INVENTOR(S) : Chikayoshi Morishima et al It is certified that error appears in the above-indentified patent and that said Letters Patent is hereby corrected as shown below:

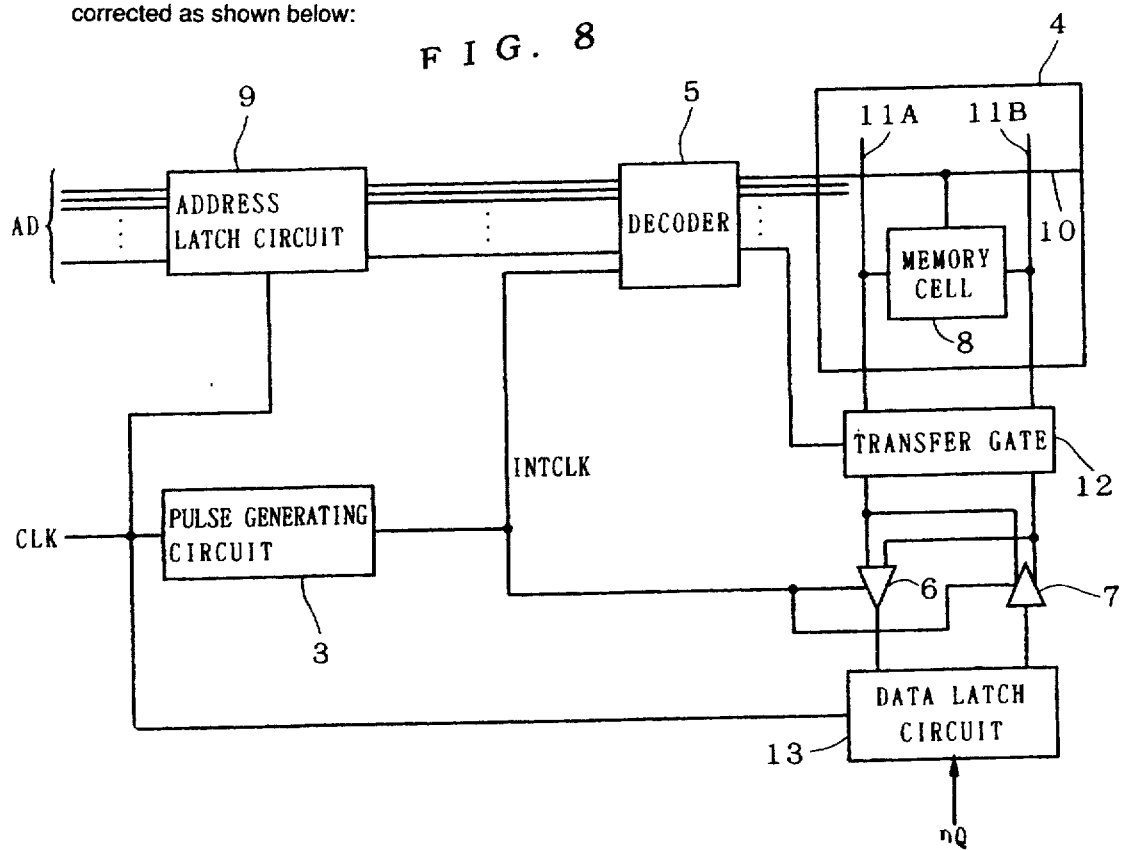

FIG. 8

UNITED STATES PATENT AND TRADEMARK OFFICE
CERTIFICATE OF CORRECTION

PATENT NO. : 5,708,802
DATED : JANUARY 13, 1998
INVENTOR(S) : CHIKAYOSHI MORISHIMA ET AL.

It is certified that error appears in the above-identified patent and that said Letters Patent is hereby corrected as shown below:

Column 2, line 5, change "limes" to --times--;

line 50, change "$K \geq b2$" to --$K \geq 2$--.

Column 3, line 31, change "relaxes" to --relates--;

line 60, change "bash" to --basis--.

Column 4, line 24, change "stole" to --store--;

line 28, change "$K > 2$" to --$K \geq 2$--;

line 41, change "slow" to --store--.

Column 5, line 43, change "tho" to --the--.

Column 6, lines 56, 60, 62, 63, change "B1" to --BI--;

line 59, change "22 and 25" to --22 to 25--.

Column 7, lines 1, 16, 27, 50, 51, 62, change "B1" to --BI--;

line 10, change "period. T0" to --period T0--.

UNITED STATES PATENT AND TRADEMARK OFFICE
CERTIFICATE OF CORRECTION

PATENT NO. : 5,708,802

DATED : JANUARY 13, 1998

INVENTOR(S) : CHIKAYOSHI MORISHIMA ET AL.

It is certified that error appears in the above-identified patent and that said Letters Patent is hereby corrected as shown below:

Column 8, line 14, change "4 ; bits" to --4 bits--;

lines 36, 37, 41, 51, change "B1" to --BI--;

line 43, change "transistors (Q20" to --transistors Q20--.

Column 9, lines 48, 56, change "B1" to --BI--;

line 66, change "store data changes" to --store data D2 changes--.

Column 10, lines 1-2, change "51 and 52" to --51 and 61--;

lines 2, 35, 48, 53, 58 and 59, change "B1" to --BI--;

line 17, change "block BICKL" to --clock BICLK--.

Column 11, line 60, change "exclusive operation" to --exclusive OR operation--.

Column 12, line 14, change "voltages" to --voltage--.

Column 13, line 7, change "exclusive or operation" to --exclusive OR operation--.